United States Patent
Dey et al.

(10) Patent No.: US 7,539,987 B1
(45) Date of Patent: May 26, 2009

(54) EXPORTING UNIQUE OPERATING SYSTEM FEATURES TO OTHER PARTITIONS IN A PARTITIONED ENVIRONMENT

(75) Inventors: Prashanto Dey, Hojai (IN); Pramod Achyut Bhandiwad, Hubli (IN); Venkat Venkatsubra, Austin, TX (US); Sivakumar Krishnasamy, Dharmapuri (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/049,342

(22) Filed: Mar. 16, 2008

(51) Int. Cl.
*G06F 9/455* (2006.01)
*G06F 9/46* (2006.01)
*G06F 3/00* (2006.01)

(52) U.S. Cl. .................... 718/1; 718/100; 718/104; 719/313; 719/319

(58) Field of Classification Search ............ 718/1, 718/100, 102, 103, 104, 105, 106, 108; 719/313, 719/319, 311, 312, 329
See application file for complete search history.

(56) References Cited

U.S. PATENT DOCUMENTS

| | | | |
|---|---|---|---|
| 6,247,109 B1 | 6/2001 | Kleinsorge et al. | |
| 6,253,224 B1 * | 6/2001 | Brice et al. | 718/1 |
| 6,647,508 B2 * | 11/2003 | Zalewski et al. | 714/3 |
| 6,892,383 B1 * | 5/2005 | Arndt | 718/1 |
| 6,990,663 B1 | 1/2006 | Arndt | |
| 7,003,771 B1 * | 2/2006 | Arndt | 718/104 |
| 7,065,549 B2 * | 6/2006 | Sun et al. | 709/201 |
| 7,188,120 B1 | 3/2007 | Leonard et al. | |
| 7,290,259 B2 * | 10/2007 | Tanaka et al. | 718/1 |
| 2002/0161891 A1 | 10/2002 | Higuchi et al. | |
| 2005/0044301 A1 | 2/2005 | Vasilevsky et al. | |
| 2006/0010450 A1 | 1/2006 | Cutler | |
| 2006/0288348 A1 * | 12/2006 | Kawamoto et al. | 718/105 |

* cited by examiner

*Primary Examiner*—Lewis A. Bullock, Jr.
*Assistant Examiner*—Abdullah Al Kawsar
(74) *Attorney, Agent, or Firm*—MaxValueIP, LLC

(57) ABSTRACT

An embodiment allows an application to use a unique feature of an operating system residing on a LPAR different than its own. If the application makes a request for a feature not available in the operating system that it runs on, a transporter module can check its records to verify if such a feature exists on another operating system in a different LPAR. If it does exist, the transporter communicates to a facilitator of the operating system on the different LPAR though a hypervisor. The facilitator provides the unique feature to the transporter, who then forwards it to the application in need.

1 Claim, 2 Drawing Sheets

EXPORTING UNIQUE OPERATING SYSTEM FEATURES TO OTHER PARTITIONS IN A PARTITIONED ENVIRONMENT

BACKGROUND OF THE INVENTION

In order to deploy multiple operating systems running various applications, several partitions are needed. In order to alleviate the need for multiple servers to house these operating systems and applications, logical partitions (LPAR) of a single server can be used. The LPAR uses a hypervisor for its operations and to communicate with other LPARs within the same Server Central Electronics Complex (CEC). A CEC is a specialized device that performs all of the high-speed computing associated with a computer. A hypervisor is a virtualization platform that allows multiple operating systems to run on a host computer at the same time in virtual machines. The hypervisor can be a firmware module that sits on top of the physical hardware resources. It provides the function of administering resource management and controlling partition access to the hardware resources.

The problem is that in the current partitioning scheme, there is no framework to export unique operating system features to the application running on different operating systems. Current solutions allow for lending computer hardware resources into logical partitions, running multiple instances of operating systems on a single multiprocessor system, and grouping LPARs to form one entity where shared resources are emulated to provide each partition a separate copy of the shared resource. However, no solution exists for the problem of exporting unique operating system features of one LPAR to the applications running on a different LPAR. This problem could arise from a case where an operating system needs to be upgraded to the latest version. However, a tested application on the current operating system version is not to be disturbed. In this case, there would be a need to create another partition with the latest operating system release and use the features of this new operating system release without disturbing the current environment.

SUMMARY OF THE INVENTION

One embodiment teaches a framework for applications running on an operating system on a logical partition (LPAR) to use features of another operating system running on a different LPAR. The LPAR containing the application in need of a resource contains the application and a generic transporter. The application serves the purposes of a feature requestor. The transporter will store information about features of a different operating system on a different LPAR as provided to it by the hypervisor. The transporter will also provide a means for the application to send requests and receive responses from the features of the other operating system. The communication between the operating systems on different LPARs is made possible through a hypervisor. The LPAR containing the operating system with a unique feature also contains a facilitator and a virtualization capability. The facilitator's role is to advertise the unique features of its operating system to the hypervisor and to handle requests from different LPARs for its unique features. The facilitator communicates to the hypervisor through a virtualization capability. Each component takes a part of the framework in order to allow the application to use a unique feature of an operating system residing on a LPAR different than its own.

DETAILED DESCRIPTION OF THE PREFERRED EMBODIMENTS

One embodiment teaches a framework for applications running on one operating system in a Logical Partition (LPAR) to use unique exported features provided by a different operating system running on a second LPAR within the same server. The framework extends the use of the hypervisor to allow an operating system to export its unique features to applications running on a different operating system on a different LPAR. That is, if a Partition A and Partition B are on the same server central electronics complex, an application running on partition A will be able to use a feature of the operating system on partition B. This allows for applications to use resources that are unavailable to them from the current operating system that they run on. Further advantages of this invention are the decoupling of the application from the operating system, a reduction of implementation costs due to applications being able to leverage features of different operating systems, a reduction of overall costs, and the invention has no porting issues.

Figure 1:
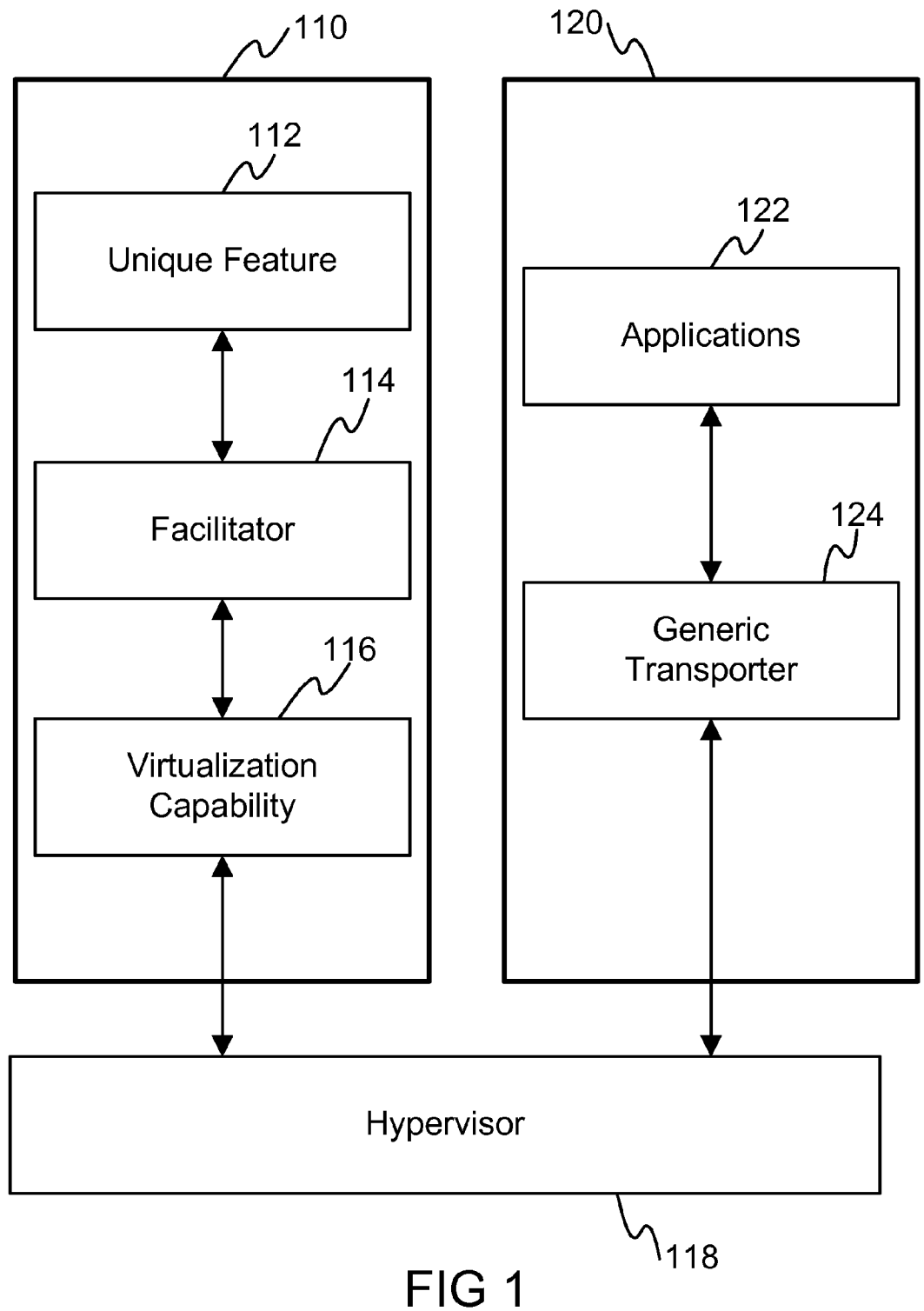
FIG. 1 is a schematic diagram of the features of two operating systems and a hypervisor.

This embodiment can be shown with the example of two operating systems and a hypervisor as seen in FIG. 1. In FIG. 1, there consists an operating system A, 120, an operating system B, 110, and a hypervisor, 118. This figure is a schematic drawing to illustrate the features within each operating system and how they interact to allow an application, 122, from operating system A, 120, to utilize a unique feature, 112, of operating system B, 110. In this example, each operating system resides on a separate LPAR. The virtualization capability, 116, is a means for the facilitator module to communicate with the hypervisor. An example of a virtualization capability, 116, is Virtual Asynchronous Services Interface (VASI). The facilitator, 114, will advertise the unique feature, 112, of operating system B, 110, to the hypervisor, 118, and this unique feature, 112, can be used by applications, 122, on operating system A, 120, on a different LPAR. The hypervisor, 118, will keep a record of the operating system unique features, 112, being advertised. The facilitator, 114, will also provide the capability of accepting and servicing functions of the exported unique features, 112, and requests from a remote system.

The generic transporter, 124, in operating system A, 120, will learn about the exported features available by querying the hypervisor, 118. The generic transporter, 124, will keep a record of the unique features, 112, offered by operating system B, 110. The Generic Transport, 124, will transport any functional requests to operating system B, 110, through the hypervisor, 118. Furthermore, upon response from operating system B, 110, the Generic Transport, 124, will receive the Data and forward the data to the application, 122. The generic transporter, 124, can be implemented as a generic kernel extension which would run on operating systems such as AIX, Linux, or z/OS.

Figure 2:
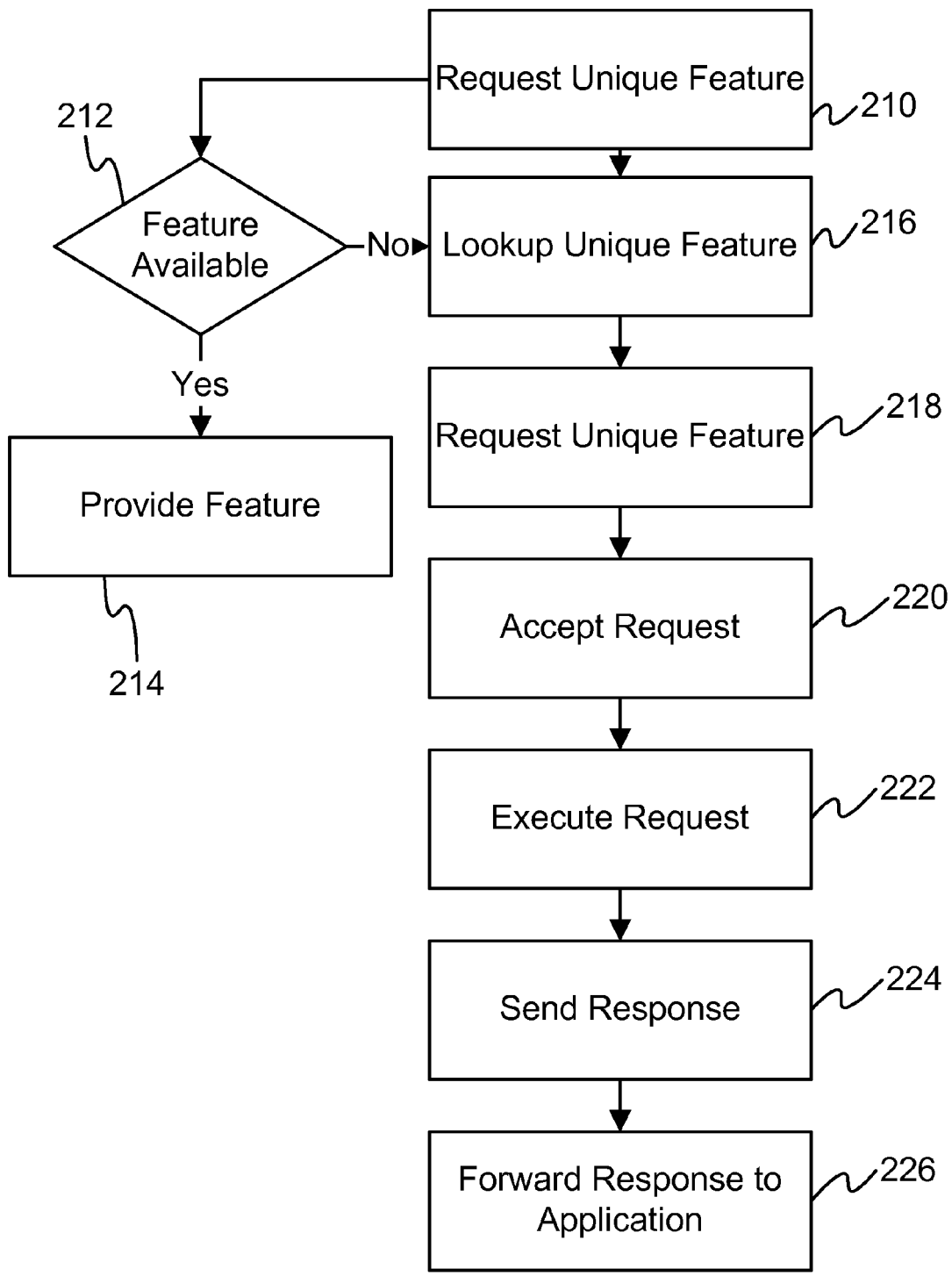
FIG. 2 is a process diagram showing the process of an application using a feature of another operating system.

FIG. 2 is a showing the process of an application using a feature of another operating system. There exists a first operating system on a first LPAR. An application running on a second operating system on a second LPAR will request a unique operating system feature, 210. The second operating system for the second LPAR that the application runs in will determine if the feature is available, 212. If the feature is available, then the second operating system will provide the feature to the application, 214. If the feature is not available, the second operating system will use the transporter module to determine if the operating system feature exists on the first LPAR with the first operating system, 216. This information will be in the records of the transporter, received from the hypervisor. The transporter learns of such exported features through queries to the hypervisor. The transporter module will then make a request for the unique operating system feature to the facilitator in the first LPAR, 218. This request will be sent through the hypervisor. The hypervisor will also take care of network specific conversions. Next, the facilitator in the first LPAR will accept the request, 220. The facilitator will execute the request, 222, the first LPAR to service the unique operating system feature for the application module in the second LPAR. The facilitator will send the response to the transporter module through the hypervisor, 224. The transport module will then forward the response to the application module, 226.

An example of the use of this invention begins when the facilitator in operating system B advertises its unique feature of Stream Control Transmission Protocol (SCTP). The hypervisor will keep a record of this feature once it has been advertised. The generic transporter will learn of this unique feature through queries of the hypervisor. An application in operating system A, on a different LPAR, will create a SCTP socket. Since the generic transport has a record that operating system B provides this feature, it creates a dummy stack on operating system B to support this task. Operating system A then calls bind. This call goes through the dummy stack on operating system B and the actual system call in operating system B is executed. The relevant information is passed back to operating system A. The module in hypervisor takes care of network specific conversions such as source IP addresses. Next, when the application on operating system A is ready to send information with the use of the SCTP protocol, the packet is sent to operating system B. Operating system B invokes the protocol specific send, using SCTP, and transmits the packet out. When a reply to the packet arrives, the virtualization capability in operating system B receives it and sends it to operating system A.

In an alternative embodiment, a system for exporting a unique operating system feature, the system for exporting comprising: a plurality of logical partitions; wherein a first logical partition of the plurality of logical partitions has a first operating system; wherein the first operating system having the unique operating system feature; wherein a second logical partition of the plurality of logical partitions has a second operating system; a hypervisor for providing a virtualization platform to run a plurality of operating systems concurrently and for controlling access of each of the plurality of logical partitions to hardware resources of the system for exporting; wherein the hypervisor communicates with each of the plurality of logical partitions; wherein a facilitator module in the first operating system communicating with the hypervisor; wherein the facilitator module sends a first notification to the hypervisor about the unique operating system feature, and the hypervisor maintains a record of the first notification associated with the first logical partition; wherein a transporter module in a kernel space of the second operating system communicating with the hypervisor; wherein the transporter module queries the hypervisor for available operating system features, the hypervisor sends a second notification to the transporter module about the unique operating system feature and associated the first logical partition, and the transporter module maintains a record of the second notification; wherein an application module running in the second logical partition requesting the unique operating system feature; and wherein if the unique operating system feature is not available from the second operating system, then the system for exporting provides for the following: the transporter module determining that the first logical partition is associated with the unique operating system feature by looking up the record of the second notification, the transporter module makes a request for the unique operating system feature to the facilitator module via the hypervisor, the facilitator accepts the request, the facilitator executes the request in the first logical partition to service the unique operating system feature for the application module, the facilitator sends a response to the transport module via the hypervisor, and the transport module forwards the response to the application module.

A method, apparatus, or device comprising one of the following items is an example of the invention: operating system, partitions, hardware resource, HMC, LPAR, PHYP, CEC, Hypervisor, transmission protocol, server, client device, PDA, mobile device, cell phone, storage to store the messages, router, switches, network, communication media, cables, fiber optics, physical layer, buffer, nodes, packet switches, computer monitor, or any display device, applying the system mentioned above, for purpose of OS and partitioning/management.

Any variations of the above teaching are also intended to be covered by this patent application.

The invention claimed is:

1. A system for exporting a unique operating system feature, said system for exporting comprising:
   hardware resources;
   a plurality of logical partitions;
   wherein a first logical partition of said plurality of logical partitions has a first operating system;
   wherein said first operating system having said unique operating system feature;
   wherein a second logical partition of said plurality of logical partitions has a second operating system;
   a hypervisor for providing a virtualization platform to run a plurality of operating systems concurrently and for controlling access of each of said plurality of logical partitions to the hardware resources of said system for exporting;
   wherein said hypervisor communicates with each of said plurality of logical partitions;
   wherein a facilitator module in said first operating system communicating with said hypervisor;
   wherein said facilitator module sends a first notification to said hypervisor about said unique operating system feature, and said hypervisor maintains a record of said first notification associated with said first logical partition;
   wherein a transporter module in a kernel space of said second operating system communicating with said hypervisor;
   wherein said transporter module queries said hypervisor for available operating system features, said hypervisor sends a second notification to said transporter module about said unique operating system feature and associated said first logical partition, and said transporter module maintains a record of said second notification;
   wherein an application module running in said second logical partition requesting said unique operating system feature; and wherein if said unique operating system feature is not available from said second operating system, then said system for exporting provides for the following:

said transporter module determining that said first logical partition is associated with said unique operating system feature by looking up said record of said second notification, said transporter module makes a request for said unique operating system feature to said facilitator module via said hypervisor, said facilitator accepts said request, said facilitator executes said request in said first logical partition to service said unique operating system feature for said application module, said facilitator sends a response to said transport module via said hypervisor, and said transport module forwards said response to said application module.

* * * * *